United States Patent
Hattori et al.

(10) Patent No.: US 10,907,731 B2
(45) Date of Patent: Feb. 2, 2021

(54) CONTROL DEVICE FOR POWER TRANSMISSION MECHANISM

(71) Applicant: TOYOTA JIDOSHA KABUSHIKI KAISHA, Toyota (JP)

(72) Inventors: Kunio Hattori, Nagoya (JP); Atsushi Ayabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/562,781

(22) Filed: Sep. 6, 2019

(65) Prior Publication Data

US 2020/0116256 A1    Apr. 16, 2020

(30) Foreign Application Priority Data

Oct. 10, 2018 (JP) ................................ 2018-192045

(51) Int. Cl.
*F16H 61/00* (2006.01)
*F16H 61/662* (2006.01)

(52) U.S. Cl.
CPC ... *F16H 61/0025* (2013.01); *F16H 61/66259* (2013.01); *F16H 2061/66204* (2013.01)

(58) Field of Classification Search
CPC .......... F16H 61/0025; F16H 61/66259; F16H 2061/66204; F16H 37/022; F16H 57/0441; F16H 61/66272; F16H 61/662; F16H 61/66236; F16H 59/70; F16H 59/42; F16H 59/40; F16H 2061/0015
See application file for complete search history.

(56) References Cited

U.S. PATENT DOCUMENTS

| | | | | |
|---|---|---|---|---|
| 6,243,638 B1* | 6/2001 | Abo | .................. | F16H 61/66254 474/18 |
| 7,435,200 B2* | 10/2008 | Kim | .................. | F16H 61/66254 477/46 |
| 8,798,877 B2* | 8/2014 | Ayabe | ............... | F16H 61/66259 701/51 |
| 9,046,174 B2* | 6/2015 | Kanehara | .......... | F16H 61/66272 |
| 9,989,148 B2* | 6/2018 | Ogata | ................. | F16H 61/0021 |
| 10,183,669 B2* | 1/2019 | Ishiizumi | .............. | B60W 10/02 |
| 10,626,988 B2* | 4/2020 | Dodo | ................ | F16H 61/66272 |

(Continued)

FOREIGN PATENT DOCUMENTS

| CN | 101205972 A | 6/2008 |
|---|---|---|
| CN | 103052832 A | 4/2013 |

(Continued)

*Primary Examiner* — Dirk Wright
(74) *Attorney, Agent, or Firm* — Oliff PLC (57) ABSTRACT

A control device for a power transmission mechanism, includes: a continuously variable transmission including a primary pulley, a secondary pulley, an oil pump; and a hydraulic control device to control a primary thrust for moving a primary movable sheave of the primary pulley and a secondary thrust for moving a secondary movable sheave of the secondary pulley, so that in a case where a secondary target pressure for generating the secondary thrust is smaller than an oil pump discharge capacity when a maximum gear ratio is requested, a primary target pressure for generating the primary thrust is made smaller than that in a case where the secondary target pressure is larger than an oil pump discharge capacity.

3 Claims, 7 Drawing Sheets

(56) References Cited

U.S. PATENT DOCUMENTS

2008/0146409 A1    6/2008    Yamaguchi et al.
2013/0218429 A1    8/2013    Ayabe et al.
2020/0032900 A1*  1/2020    Tokoi ................ F16H 61/66272

FOREIGN PATENT DOCUMENTS

| | | |
|---|---|---|
| CN | 103542085 A | 1/2014 |
| JP | 5435137 B2 | 3/2014 |
| JP | 5733060 B2 | 6/2015 |
| WO | 2012/017536 A1 | 2/2012 |

* cited by examiner

CONTROL DEVICE FOR POWER TRANSMISSION MECHANISM

CROSS-REFERENCE TO RELATED APPLICATION(S)

The present application claims priority to and incorporates by reference the entire contents of Japanese Patent Application No. 2018-192045 filed in Japan on Oct. 10, 2018.

BACKGROUND

The present disclosure relates to a control device for a power transmission mechanism.

Japanese Patent No. 5435137 discloses a control device for a power transmission mechanism in which, in order to maintain the maximum gear ratio, which is the lowest-speed side gear ratio, while suppressing belt slippage, a small value is set to a primary target thrust when a maximum gear ratio is reached and a secondary target thrust is set higher when the maximum gear ratio is not reached.

SUMMARY

There is a need for providing a control device for a power transmission mechanism capable of maintaining a maximum gear ratio while suppressing occurrence of belt slippage.

According to an embodiment, a control device for a power transmission mechanism, includes: a continuously variable transmission including a primary pulley and a secondary pulley, the primary pulley having a primary fixed sheave, which is fixed to a primary shaft, and a primary movable sheave which rotates integrally with the primary shaft and is relatively movable in an axial direction, the secondary pulley having a secondary fixed sheave, which is fixed to a secondary shaft, and a secondary movable sheave which rotates integrally with the secondary shaft and is relatively movable in an axial direction, and a transmission belt wound around the primary pulley and the secondary pulley; an oil pump to discharge hydraulic oil by being driven by a rotational driving force from an engine; and a hydraulic control device to cause the hydraulic fluid discharged from the oil pump to act on the primary movable sheave and the secondary movable sheave, so that the control device is configured to control a primary thrust for moving the primary movable sheave and a secondary thrust for moving the secondary movable sheave. Further, in a case where a secondary target pressure for generating the secondary thrust is smaller than an oil pump discharge capacity when a maximum gear ratio is requested, a primary target pressure for generating the primary thrust is made smaller than that in a case where the secondary target pressure is larger than an oil pump discharge capacity.

DETAILED DESCRIPTION

In the related art, in a low vehicle speed region, a secondary target thrust becomes grater than a primary target thrust in order to maintain the maximum gear ratio. However, at this time, if a secondary target pressure, which corresponds to the secondary target thrust, becomes greater than the ability of an oil pump to discharge oil (oil pump discharge capacity), an upshift occurs from the maximum gear ratio since the required secondary thrust is not generated, which may cause an insufficient belt torque capacity and occurrence of belt slippage.

Hereinafter, an embodiment of a control device for a power transmission mechanism according to the present disclosure will be described. It should be noted that the present disclosure is not limited by the present embodiment.

Figure 1:
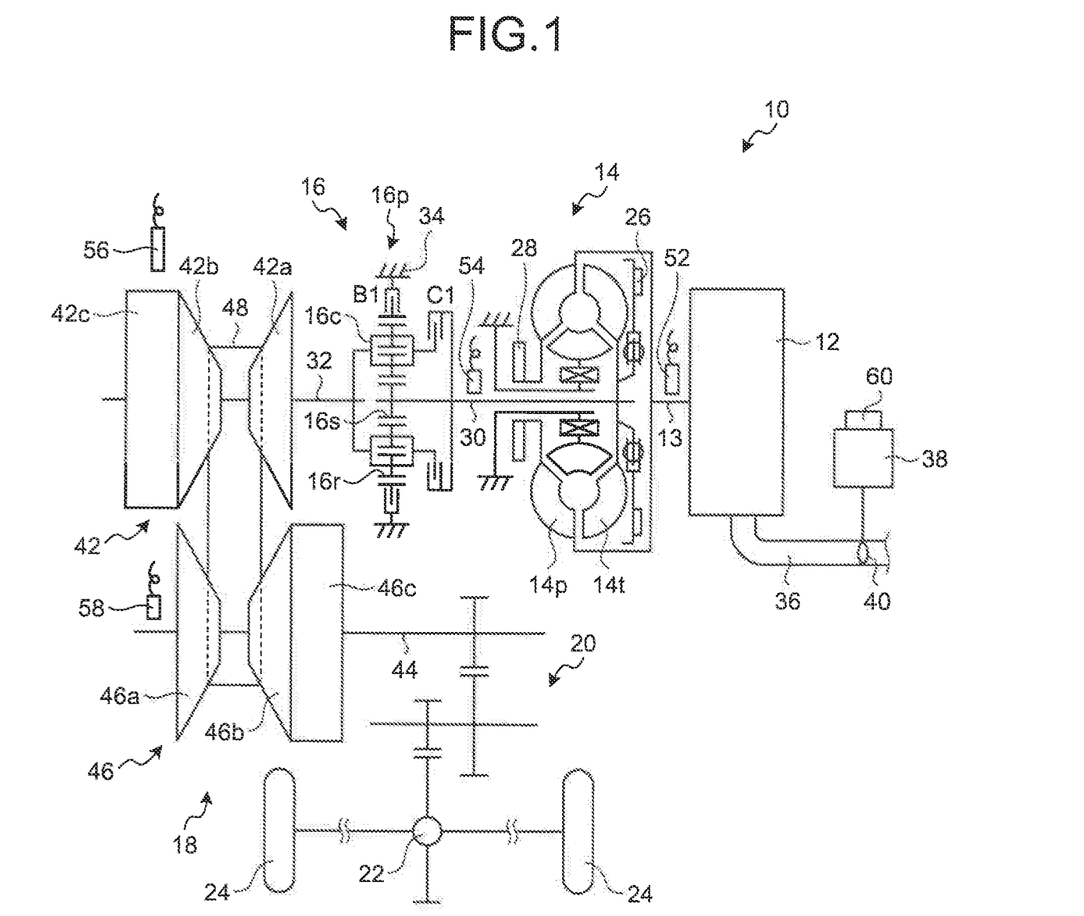
FIG. 1 is a view illustrating a schematic configuration of a power transmission mechanism that forms a vehicle according to an embodiment.

FIG. 1 is a view illustrating a schematic configuration of a power transmission mechanism that forms a vehicle 10 according to an embodiment. In FIG. 1, for example, power generated by an engine 12 used as a driving power source for traveling is transmitted to left and right drive wheels 24 via a torque converter 14 as a hydraulic transmission, a forward/reverse switching device 16, a belt-type continuously variable transmission 18 as a continuously variable transmission (CVT) for a vehicle, a reduction gear device 20, a differential gear device 22 and the like.

The torque converter 14 includes a pump impeller 14p connected to a crankshaft 13 of the engine 12, and a turbine impeller 14t connected to the forward/reverse switching device 16 via a turbine shaft 30 corresponding to an output-side member of the torque converter 14, and is to transmit power via fluid. Further, a lockup clutch 26 is provided between the pump impeller 14p and the turbine impeller 14t. By fully engaging this lockup clutch 26, the pump impeller 14p and the turbine impeller 14t are integrally rotated. The pump impeller 14p is connected with a mechanical oil pump 28 that generates a hydraulic pressure for: performing transmission control on the continuously variable transmission 18; generating belt clamping pressure in the continuously variable transmission 18; controlling a torque capacity of the lockup clutch 26; switching a power transmission path in the forward/reverse switching device 16; and supplying lubricating oil to each part of a power transmission path of the vehicle 10, by being driven by a rotational driving force from the engine 12.

The forward/reverse switching device 16 is configured mainly by a forward clutch C1 and a reverse brake B1, and a double pinion planetary gear device 16p. The turbine shaft 30 of the torque converter 14 is integrally coupled to a sun gear 16s. An input shaft 32, which is a primary shaft of the continuously variable transmission 18, is integrally connected to a carrier 16c. Further, the carrier 16c and the sun gear 16s are selectively connected via the forward clutch C1.

A ring gear 16r is to be selectively fixed to a housing 34 as a non-rotating member via the reverse brake B1. The forward clutch C1 and the reverse brake B1 correspond to an interrupting device, and both are hydraulic friction engagement devices to be frictionally engaged by a hydraulic cylinder.

In the forward/reverse switching device 16 configured in this way, when the forward clutch C1 is engaged and the reverse brake B1 is released, the turbine shaft 30 is directly connected to the input shaft 32, a forward power transmission path is established, and a driving force in the forward direction is transmitted to the continuously variable transmission 18 side. Further, when the reverse brake B1 is engaged and the forward clutch C1 is released, a reverse power transmission path is established in the forward/reverse switching device 16, the input shaft 32 is to be rotated in the reverse direction with respect to the turbine shaft 30, and a driving force in the reverse direction is transmitted to the continuously variable transmission 18 side. Further, when the forward clutch C1 and the reverse brake B1 are both released, the forward/reverse switching device 16 is to be in a neutral state (power transmission cut off state) in which power transmission is cut off.

The engine 12 is configured by an internal combustion engine such as, for example, a gasoline engine or a diesel engine. An intake pipe 36 of the engine 12 is provided with an electronic throttle valve 40 to electrically control an intake air amount $Q_{AIR}$ of the engine 12 by using a throttle actuator 38.

The continuously variable transmission 18 includes: a primary pulley 42 that is an input-side member provided on the input shaft 32, and is an input-side variable pulley having a variable effective diameter; a secondary pulley 46 that is an output-side member provided on an output shaft 44 as a secondary shaft, and is an output-side variable pulley having a variable effective diameter; and a transmission belt 48 wound between the primary pulley 42 and the secondary pulley 46, and power transmission is performed by a frictional force of the transmission belt 48 between with the primary pulley 42 and secondary pulley 46.

The primary pulley 42 is configured to include: a primary fixed sheave 42a as an input-side fixed rotational body fixed to the input shaft 32; a primary movable sheave 42b as an input-side movable rotational body provided so as to be relatively non-rotatable around the input shaft 32 and movable in the axial direction; and a primary hydraulic cylinder 42c as a hydraulic actuator that applies a primary thrust Win (=primary pressure Pin×pressure receiving area), which is an input-side thrust at the primary pulley 42 for changing a V-groove width between them.

Further, the secondary pulley 46 is configured to include: a secondary fixed sheave 46a as an output-side fixed rotational body fixed to the output shaft 44; a secondary movable sheave 46b as an output-side movable rotational body provided so as to be relatively non-rotatable around the output shaft 44 and movable in the axial direction; and a secondary hydraulic cylinder 46c as a hydraulic actuator that applies a secondary thrust Wout (=secondary pressure Pout×pressure receiving area), which is an input-side thrust at the secondary pulley 46 for changing a V-groove width between them.

Then, when a hydraulic control circuit 100 (see FIG. 3), which is a hydraulic control device, individually and independently performs pressure control on the primary pressure Pin, which is a hydraulic pressure to the primary hydraulic cylinder 42c, and on the secondary pressure Pout, which is a hydraulic pressure to the secondary hydraulic cylinder 46c, the primary thrust Win and the secondary thrust Wout are individually controlled directly or indirectly. This changes the V-groove widths of the primary pulley 42 and the secondary pulley 46, changes an winding diameter (effective diameter) of the transmission belt 48, and continuously changes a shift ratio (gear ratio) γ (=input-shaft rotation speed $N_{IN}$/output-shaft rotation speed $N_{OUT}$). Further, along with this, a frictional force (belt clamping force) of the transmission belt 48 between with the primary pulley 42 and the secondary pulley 46 is controlled such that the transmission belt 48 does not cause slippage. Thus, an actual gear ratio γ, which is an actual gear ratio, is set as a target gear ratio γ* while slippage of the transmission belt 48 is inhibited, by individually controlling the primary thrust Win and the secondary thrust Wout.

Note that the input-shaft rotation speed $N_{IN}$ is a rotation speed of the input shaft 32, and the output-shaft rotation speed $N_{OUT}$ is a rotation speed of the output shaft 44. Further, in the present embodiment, as can be seen from FIG. 1, the input-shaft rotation speed $N_{IN}$ is the same as the rotation speed of the primary pulley 42, and the output-shaft rotation speed $N_{OUT}$ is the same as the rotation speed of the secondary pulley 46.

In the continuously variable transmission 18, for example, when the primary pressure Pin is increased, the V-groove width of the primary pulley 42 is narrowed, and the gear ratio γ is decreased. That is, the continuously variable transmission 18 is upshifted. In addition, when the primary pressure Pin is lowered, the V-groove width of the primary pulley 42 is widened, and the gear ratio γ is increased. That is, the continuously variable transmission 18 is downshifted. Therefore, by maximizing the V-groove width of the primary pulley 42, a maximum gear ratio γmax (a lowest-speed side gear ratio, Lowest) is formed as the gear ratio γ of the continuously variable transmission 18.

Figure 2:
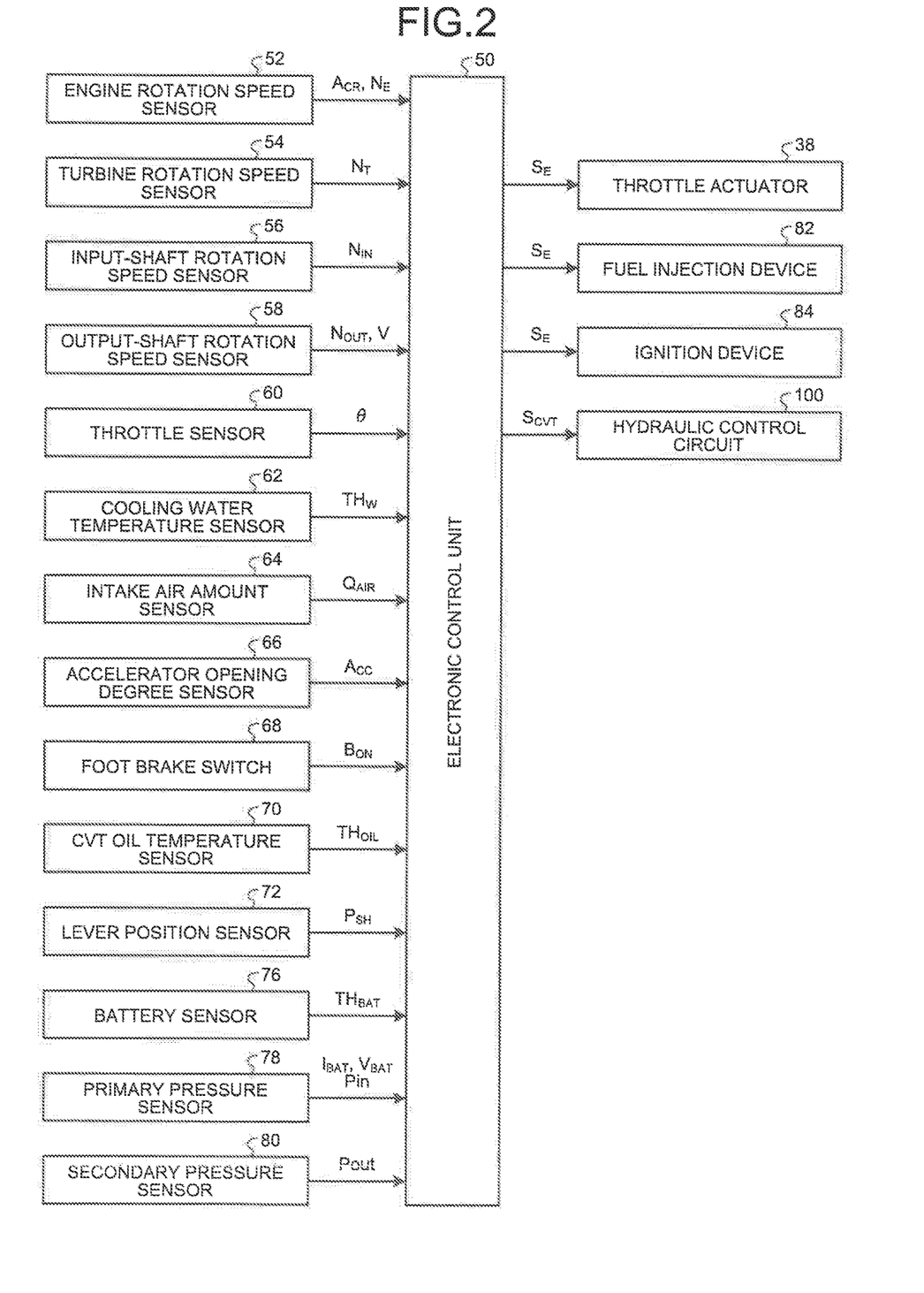
FIG. 2 is a block diagram illustrating a main part of a control system provided in a vehicle.
Figure 3:
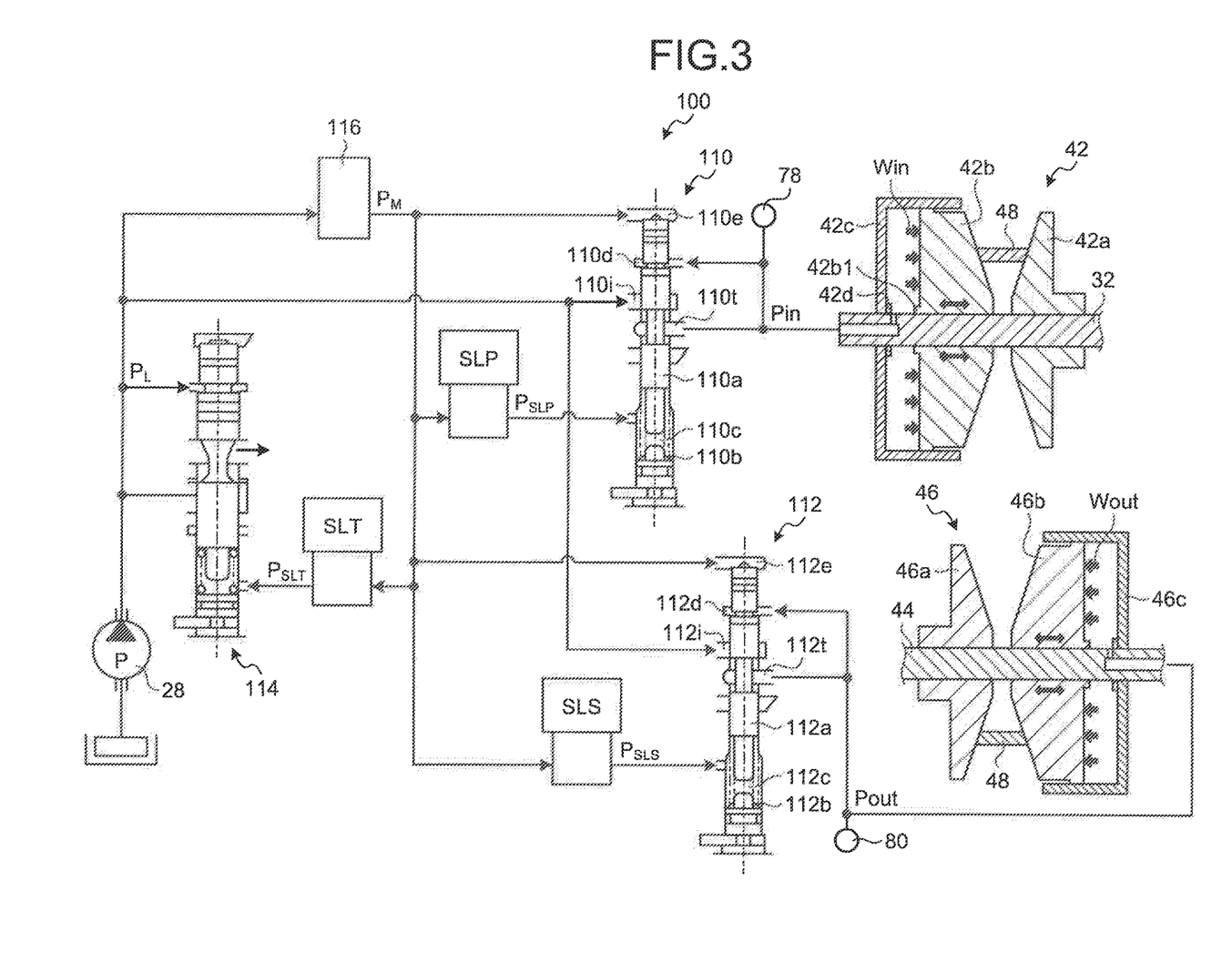
FIG. 3 is a hydraulic circuit diagram illustrating a main part related to hydraulic control related to shifting of a continuously variable transmission in a hydraulic control circuit.

Note that, in the present embodiment, for example, as illustrated in FIG. 3, a structure is employed in which an end tip 42b1 of the primary movable sheave 42b movable in the axial direction of the input shaft 32 abuts on a stopper ring 42d to mechanically inhibit a movement of the primary movable sheave 42b, that is, a movement of the primary pulley 42 in a direction to widen the V-groove width. As a result, the Lowest is realized mechanically. Thus, a movement of the primary movable sheave 42b axially moved to change the effective diameter of the primary pulley 42 is mechanically inhibited to determine the maximum gear ratio γmax, FIG. 2 is a block diagram for explaining a main part of a control system provided in the vehicle 10. In FIG. 2, the vehicle 10 is provided with an electronic control unit 50. The electronic control unit 50 is configured to include, for example, a so-called microcomputer provided with a central processing unit (CPU), a random access memory (RAM), a read only memory (ROM), an input/output interface and the like. The CPU performs various controls on the vehicle 10 by performing signal processing in accordance with a program stored in advance in the ROM while utilizing a temporary storage function of the RAM. For example, the electronic control unit 50 is to execute output control of the engine 12, shift control and belt clamping pressure control of the continuously variable transmission 18, torque capacity control of the lockup clutch 26 and the like. Meanwhile, the configuration may be divided for engine control and for hydraulic pressure control of the continuously variable transmission 18 and the lockup clutch 26 and the like, as necessary.

The electronic control unit 50 is individually supplied with signals and the like individually indicating a crankshaft rotation angle $A_{CR}$, an engine rotation speed $N_E$, a turbine rotation speed $N_T$, an input-shaft rotation speed $N_{IN}$, an output-shaft rotation speed $N_{OUT}$, a throttle valve opening degree θ, a cooling water temperature $TH_W$ of the engine 12, an intake air amount $Q_{AIR}$ of the engine 12, an accelerator opening degree $A_{CC}$, brake ON $B_{ON}$, an oil temperature $TH_{OIL}$, a lever position $P_{SH}$, a battery temperature $TH_{BAT}$, a battery input/output current $I_{BAT}$, a battery voltage $V_{BAT}$, a primary pressure Pin, and a secondary pressure Pout.

The crankshaft rotation angle $A_{CR}$ and the engine rotation speed $N_E$ are a rotation angle of the crankshaft 13 and a rotation speed of the engine 12, respectively, and are detected by an engine rotation speed sensor 52. The turbine rotation speed $N_T$ is a rotation speed of the turbine shaft 30 and is detected by a turbine rotation speed sensor 54. The input-shaft rotation speed $N_{IN}$ is an input rotation speed of the continuously variable transmission 18, and is detected by an input-shaft rotation speed sensor 56. The output-shaft rotation speed $N_{OUT}$ is an output rotation speed of the continuously variable transmission 18 corresponding to a vehicle speed V, and is detected by an output-shaft rotation speed sensor 58. The throttle valve opening degree θ is an opening degree of the electronic throttle valve 40 and is detected by a throttle sensor 60. The cooling water temperature $TH_W$ of the engine 12 is detected by a cooling water temperature sensor 62. The intake air amount $Q_{AIR}$ of the engine 12 is detected by an engine intake air amount sensor 64. The accelerator opening degree $A_{CC}$ is an operation amount of an accelerator pedal as a driver's required acceleration amount, and is detected by an accelerator opening degree sensor 66. The brake ON $B_{ON}$ indicates a state where a foot brake as a service brake is operated, and is detected by a foot brake switch 68. The oil temperature $TH_{OIL}$ is an oil temperature of hydraulic oil of the continuously variable transmission 18 or the like, and is detected by a CVT oil temperature sensor 70. The lever position $P_{SH}$ is a position of the shift lever, and is detected by a lever position sensor 72. The battery temperature $TH_{BAT}$, the battery input/output current $I_{BAT}$, and the battery voltage $V_{BAT}$ are detected by a battery sensor 76. The primary pressure Pin is a hydraulic pressure supplied to the primary pulley 42, and is detected by a primary pressure sensor 78. The secondary pressure Pout is a hydraulic pressure supplied to the secondary pulley 46, and is detected by a secondary pressure sensor 80.

Note that the electronic control unit 50 sequentially calculates a state of charge (charge capacity) SOC of a battery on the basis of, for example, the battery temperature $TH_{BAT}$, the battery input/output current $I_{BAT}$, the battery voltage $V_{BAT}$ and the like. Further, the electronic control unit 50 sequentially calculates an actual gear ratio γ (=$N_{IN}/N_{OUT}$) of the continuously variable transmission 18 on the basis of, for example, the output-shaft rotation speed $N_{OUT}$ and the input-shaft rotation speed $N_{IN}$.

Further, from the electronic control unit 50, an engine output control command signal $S_E$ for output control of the engine 12, a hydraulic control command signal $S_{CVT}$ for hydraulic control related to shifting of the continuously variable transmission 18 and the like are individually output. Specifically, as the engine output control command signal $S_E$, a throttle signal for driving the throttle actuator 38 to control opening and closing of the electronic throttle valve 40, an injection signal for controlling an amount of fuel injected from a fuel injection device 82, an ignition timing signal for controlling the ignition timing of the engine 12 by an ignition device 84 or the like, are output. Further, as the hydraulic control command signal $S_{CVT}$, a command signal for driving a linear solenoid valve SLP that regulates the primary pressure Pin, a command signal for driving a linear solenoid valve SLS that regulates the secondary pressure Pout, and a command signal for driving a linear solenoid valve SLT that controls a line hydraulic pressure $P_L$ and the like are output to the hydraulic control circuit 100.

FIG. 3 is a hydraulic circuit diagram illustrating a main part related to hydraulic control related to shifting of the continuously variable transmission 18 in the hydraulic control circuit 100. In FIG. 3, for example, the hydraulic control circuit 100 includes: an oil pump 28; a primary pressure control valve 110 that regulates the primary pressure Pin; a secondary pressure control valve 112 that regulates the secondary pressure Pout; a primary regulator valve (line hydraulic pressure regulating valve) 114; a modulator valve 116; the linear solenoid valve SLT; the linear solenoid valve SLP; the linear solenoid valve SLS and the like.

The line hydraulic pressure $P_L$ is, for example, with a hydraulic pressure output (generated) from the oil pump 28 as an original pressure, adjusted by the relief primary regulator valve 114 to a value according to an engine load or the like on the basis of a control hydraulic pressure $P_{SLT}$, which is an output hydraulic pressure of the linear solenoid valve SLT. Specifically, the line hydraulic pressure $P_L$ is regulated on the basis of the control hydraulic pressure $P_{SLT}$ that has been set to obtain a hydraulic pressure in which a predetermined allowance (margin) is added to the higher hydraulic pressure out of the primary pressure Pin and the secondary pressure Pout. Therefore, in a pressure regulation operation of the primary pressure control valve 110 and the secondary pressure control valve 112, it is possible to avoid a shortage of the line hydraulic pressure $P_L$, which is the original pressure, and to inhibit unnecessary increase of the line hydraulic pressure $P_L$. Further, a modulator hydraulic pressure $P_M$ is each original pressure of: the control hydraulic pressure $P_{SLT}$ controlled by the electronic control unit 50; a control hydraulic pressure $P_{SLP}$ that is an output hydraulic pressure of the linear solenoid valve SLP; and a control hydraulic pressure $P_{SLS}$ that is an output hydraulic pressure of the linear solenoid valve SLS, and is adjusted to a constant pressure by the modulator valve 116 with the line hydraulic pressure $P_L$ as the original pressure.

The primary pressure control valve 110 includes a spool valve element 110a, a spring 110b, an oil chamber 110c, a feedback oil chamber 110d, and an oil chamber 110e. The spool valve element 110a is to open and close an input port 110i by being provided capable of moving in the axial direction, to enable the line hydraulic pressure $P_L$ to be supplied from the input port 110i to the primary pulley 42 through an output port 110t. The spring 110b is a biasing unit to bias the spool valve element 110a in the valve opening direction. The oil chamber 110c is to accommodate the spring 110b and receive the control hydraulic pressure $P_{SLP}$ in order to apply a thrust in the valve opening direction to the spool valve element 110a. The feedback oil chamber 110d is to receive the line hydraulic pressure $P_L$ output from the output port 110t in order to apply a thrust in the valve closing direction to the spool valve element 110a. The oil chamber 110e is to receive the modulator hydraulic pressure $P_M$ in order to apply a thrust in the valve closing direction to the spool valve element 110a.

The primary pressure control valve 110 configured in this way, for example, performs pressure regulation control on the line hydraulic pressure $P_L$ with the control hydraulic pressure $P_{SLP}$ as a pilot pressure, and supplies the pressure to the primary hydraulic cylinder 42c of the primary pulley 42. This causes control of the primary pressure Pin supplied to the primary hydraulic cylinder 42c. For example, when the control hydraulic pressure $P_{SLP}$ output from the linear solenoid valve SLP increases from a state where a predetermined hydraulic pressure is supplied to the primary hydraulic cylinder 42c, the spool valve element 110a of the primary pressure control valve 110 moves upward. This increases the primary pressure Pin to the primary hydraulic cylinder 42c. Whereas, when the control hydraulic pressure $P_{SLP}$ output from the linear solenoid valve SLP decreases from a state where a predetermined hydraulic pressure is supplied to the primary hydraulic cylinder 42c, the spool valve element 110a of the primary pressure control valve 110 moves downward. This decreases the primary pressure Pin to the primary hydraulic cylinder 42c.

The secondary pressure control valve 112 includes a spool valve element 112a, a spring 112b, an oil chamber 112c, a feedback oil chamber 112d, and an oil chamber 112e. The spool valve element 112a is to open and close an input port 112i by being provided capable of moving in the axial direction, to enable the line hydraulic pressure $P_L$ to be supplied from the input port 112i to the secondary pulley 46 as the secondary pressure Pout, through an output port 112t. The spring 112b is a biasing unit to bias the spool valve element 112a in the valve opening direction. The oil chamber 112c is to accommodate the spring 112b and receive the control hydraulic pressure PSLS in order to apply a thrust in the valve opening direction to the spool valve element 112a. The feedback oil chamber 112d is to receive the secondary pressure Pout output from the output port 112t in order to apply a thrust in the valve closing direction to the spool valve element 112a. The oil chamber 112e is to receive the modulator hydraulic pressure $P_M$ in order to apply a thrust in the valve closing direction to the spool valve element 112a.

The secondary pressure control valve 112 configured in this way, for example, performs pressure regulation control on the line hydraulic pressure $P_L$ with the control hydraulic pressure $P_{SLS}$ as a pilot pressure, and supplies the pressure to the secondary hydraulic cylinder 46c of the secondary pulley 46. This causes control of the secondary pressure Pout supplied to the secondary hydraulic cylinder 46c. For example, when the control hydraulic pressure $P_{SLS}$ output from the linear solenoid valve SLS increases from a state where a predetermined hydraulic pressure is supplied to the secondary hydraulic cylinder 46c, the spool valve element 112a of the secondary pressure control valve 112 moves upward. This increases the secondary pressure Pout to the secondary hydraulic cylinder 46c. Whereas, when the control hydraulic pressure $P_{SLS}$ output from the linear solenoid valve SLS decreases from a state where a predetermined hydraulic pressure is supplied to the secondary hydraulic cylinder 46c, the spool valve element 112a of the secondary pressure control valve 112 moves downward. This decreases the secondary pressure Pout to the secondary hydraulic cylinder 46c.

Figure 4:
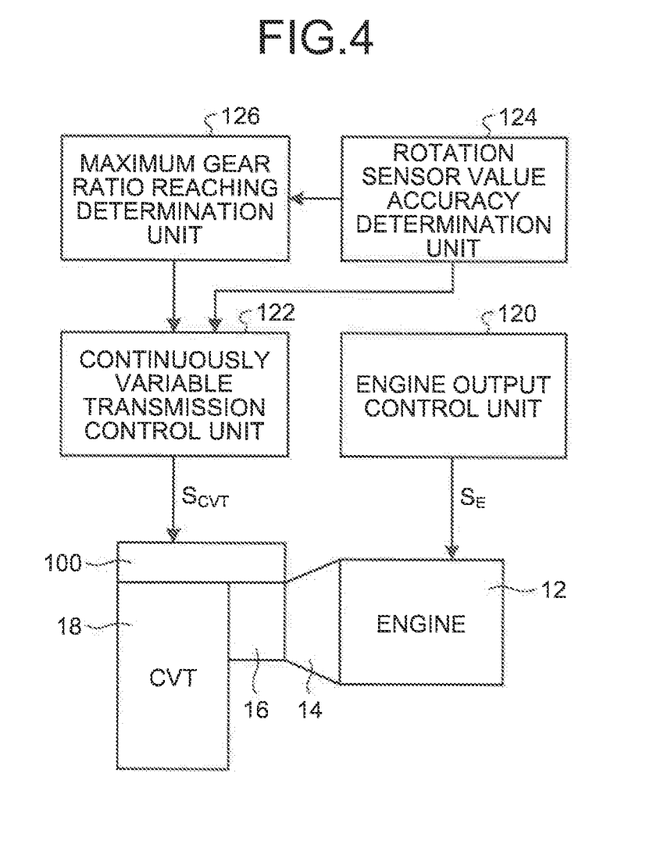
FIG. 4 is a functional block diagram illustrating a main part of a control function of an electronic control unit.

In the hydraulic control circuit 100 configured in this way, for example, the primary pressure Pin adjusted by the linear solenoid valve SLP, and the secondary pressure Pout adjusted by the linear solenoid valve SLS are controlled to generate a belt clamping pressure that does not cause belt slippage and does not increase unnecessarily, in the primary pulley 42 and the secondary pulley 46. Further, as described later, by changing a thrust ratio Rw (=Wout/Win) of the primary pulley 42 and the secondary pulley 46 with a mutual relationship between the primary pressure Pin and the secondary pressure Pout, the gear ratio γ of the continuously variable transmission 18 is changed. For example, the gear ratio γ is increased as the thrust ratio Rw is increased. That is, the continuously variable transmission 18 is downshifted, FIG. 4 is a functional block diagram for explaining a main part of a control function of the electronic control unit 50. In FIG. 4, an engine output control unit 120 respectively outputs, for example, engine output control command signals SE such as a throttle signal, an injection signal, and an ignition timing signal for output control of the engine 12, to the throttle actuator 38, the fuel injection device 82, and the ignition device 84. For example, the engine output control unit 120 sets a target engine torque TE* for obtaining a driving force (driving torque) according to the accelerator opening degree $A_{CC}$, and performs opening and closing control on the electronic throttle valve 40 with the throttle actuator 38 so as to obtain the target engine torque TE*. Further, additionally, the engine output control unit 120 controls a fuel injection amount by the fuel injection device 82, and controls ignition timing by the ignition device 84.

A continuously variable transmission control unit 122 determines a primary command pressure Pintgt as a command value of the primary pressure Pin and a secondary command pressure Pouttgt as a command value of the secondary pressure Pout, for example, so as to achieve the target gear ratio γ* of the continuously variable transmission 18 while inhibiting occurrence of belt slippage of the continuously variable transmission 18.

Specifically, the continuously variable transmission control unit 122 determines the target gear ratio γ*, which is a gear ratio γ to be achieved after shifting of the continuously variable transmission 18. The continuously variable transmission control unit 122 sets a target input-shaft rotation speed $N_{IN}$*, for example, with the accelerator opening degree $A_{CC}$ as a parameter, from a previously stored relationship (shift map) of the vehicle speed V corresponding to the output-shaft rotation speed $N_{OUT}$ and the target input-shaft rotation speed $N_{IN}$* of the continuously variable transmission 18, on the basis of a vehicle state indicated by the actual vehicle speed V and the accelerator opening degree $A_{CC}$. Then, on the basis of the target input-shaft rotation speed $N_{IN}$*, the continuously variable transmission control unit 122 calculates the target gear ratio γ* (=$N_{IN}$*/$N_{OUT}$). The shift map corresponds to shift conditions, and the target input-shaft rotation speed $N_{IN}$* is to be set such that the gear ratio γ increases as the vehicle speed V decreases and the accelerator opening degree $A_{CC}$ increases. Then, the target gear ratio γ* is determined within a range of a minimum gear ratio γmin (highest-speed gear ratio, Highest) of the continuously variable transmission 18 and the maximum gear ratio γmax (lowest-speed gear ratio, Lowest).

Next, the continuously variable transmission control unit 122, for example, with an input torque T of the continuously variable transmission 18 as a parameter, sets a target secondary thrust Wout* from the relationship (thrust map), which is experimentally determined and stored in advance such that belt slippage does not occur, between the gear ratio γ and the target secondary thrust Wout*, on the basis of an input torque TIN of the continuously variable transmission 18 and a vehicle state indicated by the actual gear ratio γ. This input torque TIN of the continuously variable transmission 18 is, for example, calculated by the electronic control unit 50, as a torque (=TE×t) obtained by multiplying the engine torque TE by a torque ratio t (=turbine torque TT/pump torque TP) of the torque converter 14. Further, this engine torque TE is, for example, with the intake air amount $Q_{AIR}$ as a required load for the engine 12 as a parameter, calculated as an estimated engine torque TEes by the electronic control unit 50 from a relationship, which is experimentally determined and stored in advance, between the engine rotation speed $N_E$ and the engine torque TE (engine torque characteristic diagram), on the basis of the intake air amount $Q_{AIR}$ and the engine rotation speed $N_E$. Alternatively, as the engine torque TE, for example, an actual output torque (actual engine torque) TE of the engine 12 detected by a torque sensor or the like may be used. Further, the torque ratio t of the torque converter 14 is a function of a speed ratio e of the torque converter 14 (=turbine rotation speed $N_T$/pump rotation speed NP), and is calculated by the electronic control unit 50 on the basis of the actual speed ratio e, for example, from the relationship, which is experimentally determined and stored in advance, of the speed ratio e with each of the torque ratio t, an efficiency η, and a capacity coefficient C.

Note that the estimated engine torque TEes is to be calculated so as to represent the actual engine torque TE itself, and in particular, the estimated engine torque TEes is handled as the actual engine torque TE except in a case of distinguishing from the actual engine torque TE. Therefore, the estimated engine torque TEes is assumed to also include the actual engine torque TE.

Further, the continuously variable transmission control unit 122 determines the thrust ratio Rw (=Wout/Win) on the basis of the target gear ratio γ*, for example, from a relationship, which is experimentally set in advance, between the target gear ratio γ* and the thrust ratio Rw. The thrust ratio Rw is set larger as the target gear ratio γ* increases, and the thrust ratio Rw determined on the basis of the target gear ratio γ* is, for example, the thrust ratio Rw for steadily maintaining the gear ratio γ of the continuously variable transmission 18 at the target gear ratio γ*, that is, the thrust ratio Rw for maintaining the gear ratio γ constant at the target gear ratio γ*.

Then, the continuously variable transmission control unit 122 sets a target primary thrust Win* (=Wout*/Rw) on the basis of, for example, the determined thrust ratio Rw and the target secondary thrust Wout*. Thus, basically, as the thrust for achieving the target gear ratio γ* of the continuously variable transmission 18 while inhibiting occurrence of belt slippage of the continuously variable transmission 18, the target primary thrust Win* and the target secondary thrust Wout* are set. The continuously variable transmission control unit 122 converts, for example, the target primary thrust Win* and the target secondary thrust Wout* on the basis of the pressure receiving areas of the hydraulic cylinders 42c and 46c, calculates a target primary pressure Pin* (=Win*/pressure receiving area) and a target secondary pressure Pout* (=Wout*/pressure receiving area), and determines the primary command pressure Pintgt and the secondary command pressure Pouttgt.

The continuously variable transmission control unit 122 outputs the primary command pressure Pintgt and the secondary command pressure Pouttgt to the hydraulic control circuit 100 as the hydraulic control command signal $S_{CVT}$, for example, so as to obtain the target primary pressure Pin* and the target secondary pressure Pout*. In accordance with the hydraulic control command signal $S_{CVT}$, the hydraulic control circuit 100 operates the linear solenoid valve SLP to adjust the primary pressure Pin, and operates the linear solenoid valve SLS to adjust the secondary pressure Pout.

Here, there may be variations in control in various devices, and there are also variations in hydraulic control related to shifting of the continuously variable transmission 18 of the present embodiment. For example, there are variations in the control hydraulic pressures $P_{SLP}$ and $P_{SLS}$ with respect to respective control currents to the linear solenoid valves SLP and SLS, variations in a drive circuit that outputs the control currents, and variations such as an estimation error of the input torque TIN. Therefore, such variations may cause belt slippage of the continuously variable transmission 18, or inhibit achievement of the target gear ratio γ* of the continuously variable transmission 18. Therefore, the continuously variable transmission control unit 122 corrects a set value of the target secondary thrust Wout* (target secondary pressure Pout*) on the basis of a secondary pressure sensor value SPout, for example, such that the secondary pressure sensor value SPout, which is a signal representing the secondary pressure Pout detected by the secondary pressure sensor 80, becomes the target secondary pressure Pout*. In addition, the continuously variable transmission control unit 122 corrects a set value of the target primary thrust Win* (target primary pressure Pin*) with feedback control based on a deviation Δγ (=γ*−γ) between the actual gear ratio γ and the target gear ratio γ*, for example, such that the actual gear ratio γ coincides with the target gear ratio γ*.

Here, in the rotation speed sensors such as the input-shaft rotation speed sensor 56 and the output-shaft rotation speed sensor 58, a rotation speed may not be accurately detected in a low rotation speed region where the rotation speed is extremely close to zero. For example, in a case where a well-known electromagnetic pickup type sensor is adopted as a rotation speed sensor, when the actual rotation speed is in the low rotation speed region, the number of pulse signals within a predetermined time may vary or the output timing of the pulse signals may be delayed due to the characteristics of the sensor, which may deteriorate the detection accuracy itself. That is, due to the characteristics of the rotation speed sensor, for example, it is not possible to accurately detect the rotation speed in the low rotation speed region, and the detected value of the rotation speed (rotational sensor detected value) by the rotation speed sensor may not reflect the actual rotation speed. Then, in a case where the rotation sensor detection value reflects the actual rotation speed, the target gear ratio γ* can be appropriately realized by feedback control on the target primary thrust Win* (target primary pressure Pin*) based on the deviation Δγ between the actual gear ratio γ and the target gear ratio γ*.

However, in a case where the rotation sensor detection value does not reflect the actual rotation speed because the rotation speed is in the low rotation speed region, there is a possibility that it is not possible to properly perform feedback control on the target primary thrust Win* (target primary pressure Pin*), and it is not possible to appropriately realize the target gear ratio γ* due to the above-described variations or the like in control. In particular, in the low rotation speed region where the detection accuracy itself of the input-shaft rotation speed sensor 56 and the output-shaft rotation speed sensor 58 may deteriorate, it is desired to maintain the gear ratio γ of the continuously variable transmission 18 at the maximum gear ratio γmax, in order to ensure re-acceleration performance in restarting of the vehicle while the vehicle is stopped or in low speed traveling.

However, in this low rotation speed region, even if the target primary thrust Win* (target primary pressure Pin*) and the target secondary thrust Wout* (target secondary pressure Pout*) for maintaining the maximum gear ratio γmax while inhibiting belt slippage are set, there is a possibility that it is not possible to properly perform the above feedback control and it is not possible to properly maintain the maximum gear ratio γmax due to a variation and the like in control. Therefore, for example, it is desirable to perform control to the maximum gear ratio γmax while the rotation sensor detection value reflects the actual rotation speed during deceleration of the vehicle, but there is a possibility that it is not possible to reach the maximum gear ratio γmax during rapid deceleration traveling or the like even when shifting is performed at the maximum shift speed (change speed of gear ratio) in consideration of belt slippage and the like.

Therefore, for example, in the electronic control unit 50 of the present embodiment, in realizing the target gear ratio γ*, in order to calculate the actual gear ratio γ, control methods of the primary thrust Win (primary pressure Pin) and the secondary thrust Wout (secondary pressure Pout) are made different so as to maintain the maximum gear ratio γmax while inhibiting slippage of the transmission belt 48, on the basis of whether the actual gear ratio γ has already become the maximum gear ratio γmax, when it is determined that at least one of the detected values of the input-shaft rotation speed $N_{IN}$ and the output-shaft rotation speed $N_{OUT}$ respectively detected by the input-shaft rotation speed sensor 56 and the output-shaft rotation speed sensor 58 does not reflect the actual rotation speed.

Such differentiation of the control methods of the primary thrust Win and the secondary thrust Wout is performed during deceleration of the vehicle where control is performed toward the maximum gear ratio γmax, in which it is desired to maintain the maximum gear ratio γmax while inhibiting belt slippage, for example, in order to properly ensure re-acceleration performance in restarting of the vehicle while the vehicle is stopped or in low speed traveling. Further, the thrust for maintaining the maximum gear ratio γmax while inhibiting slippage of the transmission belt 48 (the primary thrust force Win and the secondary thrust Wout) is, when the target gear ratio γ* of the continuously variable transmission 18 is the maximum gear ratio γmax, for example, the target secondary thrust force Wout* that is sequentially set on the basis of the input torque TIN of the continuously variable transmission 18 by the continuously variable transmission control unit 122, and the target primary thrust Win* that is sequentially set on the basis of the target secondary thrust Wout* and the thrust ratio Rw based on the target gear ratio γ*.

More specifically, a rotation sensor value accuracy determination unit 124 determines, for example, whether both detected values of the input-shaft rotation speed $N_{IN}$ and the output-shaft rotation speed $N_{OUT}$ respectively detected by the input-shaft rotation speed sensor 56 and the output-shaft rotation speed sensor 58 reflect the actual rotation speed on the basis of whether both the detected values of the input-shaft rotation speed $N_{IN}$ and the output-shaft rotation speed $N_{OUT}$ are equal to or higher than a predetermined extremely low rotation speed N'. This predetermined extremely low rotation speed N' is, for example, an extremely low rotation speed determination value that is experimentally determined and set in advance as a rotation speed that results in a rotation speed region where the reliability of the rotation sensor detection value decreases since it is not possible for the rotation sensor detection value to accurately detect the actual rotation speed due to the characteristics of the sensor, when the detected value of the rotational sensor becomes less than the extremely low rotation speed N'. Therefore, the rotation sensor value accuracy determination unit 124 determines that at least one of the detection values of the input-shaft rotation speed $N_{IN}$ and the output-shaft rotation speed $N_{OUT}$ does not reflect the actual rotation speed, for example, when at least one of the detected values of the input-shaft rotation speed $N_{IN}$ and the output-shaft rotation speed $N_{OUT}$ is in a rotation speed region lower than the predetermined extremely low rotation speed N'. Further, the rotation sensor value accuracy determination unit 124 also determines whether the rotation sensor detection value is reliable, for example, by determining whether both the detected values of the input-shaft rotation speed $N_{IN}$ and the output-shaft rotation speed $N_{OUT}$ reflect the actual rotation speed.

Meanwhile, the predetermined extremely low rotation speed N is desirably set for each of the rotation speed sensors such as the input-shaft rotation speed sensor 56 and the output-shaft rotation speed sensor 58, for example.

For example, when it is determined by the rotation sensor value accuracy determination unit 124 that both of the detection values of the input-shaft rotation speed $N_{IN}$ and the output-shaft rotation speed $N_{OUT}$ reflect the actual rotation speed (the rotation sensor detection value is reliable), the continuously variable transmission control unit 122 control the primary thrust Win (primary pressure Pin) and the secondary thrust Wout (secondary pressure Pout) so as to obtain the thrust (the target primary thrust Win* and the target secondary thrust Wout*) for achieving the target gear ratio γ* of the continuously variable transmission 18 while inhibiting occurrence of belt slippage of the continuously variable transmission 18, as described above.

For example, when it is determined by the rotation sensor value accuracy determination unit 124 that at least one of the detection values of the input-shaft rotation speed $N_{IN}$ and the output-shaft rotation speed $N_{OUT}$ does not reflect the actual rotation speed (the rotation sensor detection value is not reliable), a maximum gear ratio reaching determination unit 126 determines whether the actual gear ratio γ has already become the maximum gear ratio γmax. Note that this maximum gear ratio γmax is, for example, a maximum gear ratio determination value that has been determined and set in advance so as to enable determination as a gear ratio corresponding to the mechanical Lowest.

For example, when it is determined by the maximum gear ratio reaching determination unit 126 that the actual gear ratio γ has already become the maximum gear ratio γmax, the continuously variable transmission control unit 122 sets the target primary thrust Win* and the target secondary thrust Wout* as a thrust for maintaining the maximum gear ratio γmax while inhibiting slippage of the transmission belt 48, and exclusively sets the target primary thrust Win* lower by a predetermined value.

Whereas, for example, when it is determined by the maximum gear ratio reaching determination unit 126 that the actual gear ratio γ has not yet become the maximum gear ratio γmax, the continuously variable transmission control unit 122 sets the target primary thrust Win* and the target secondary thrust Wout* as a thrust for maintaining the maximum gear ratio γmax while inhibiting slippage of the transmission belt 48, and exclusively sets the target secondary thrust Wout* higher by a predetermined value. This predetermined value is a value that is experimentally determined and set in advance as a control variation of a thrust for reliably obtaining the thrust for maintaining the maximum gear ratio γmax while inhibiting slippage of the transmission belt 48, in controlling the primary thrust Win and the secondary thrust Wout. This control variation is, for example, a variation in control in hydraulic pressure control related to shifting of the continuously variable transmission 18 as described above. That is, this control variation is a variation in control for obtaining a pulley pressure (the primary pressure Pin and the secondary pressure Pout) for maintaining the maximum gear ratio γmax while at least inhibiting slippage of the transmission belt 48, for example, no matter how much the primary pressure Pin and the secondary pressure Pout vary with respect to the primary command pressure Pintgt and the secondary command pressure Pouttgt.

Thus, the present embodiment is adapted in terms of which of the target primary thrust Win* (primary command pressure Pintgt) and the target secondary thrust Wout* (secondary command pressure Pouttgt) is to be added with the control variation in order to reliably realize the maximum gear ratio γmax, when it is determined that at least one of the detection values of the input-shaft rotation speed $N_{IN}$ and the output-shaft rotation speed $N_{OUT}$ does not reflect the actual rotation speed.

More specifically, even if the rotation sensor detection value does not reflect the actual rotation speed, when it is known that the actual gear ratio γ is the maximum gear ratio γmax, since movement of the primary movable sheave 42b in a direction to widen the V-groove width of the primary pulley 42 is mechanically inhibited and the primary movable sheave 42b does not move more than that, the belt clamping pressure is not to decrease any further. Therefore, without performing feedback control of the primary thrust Win (that is, primary pressure Pin) based on the rotation sensor detection value with poor detection accuracy, the belt clamping pressure is secured while the maximum gear ratio γmax is maintained even if the primary command pressure Pintgt is lowered from the set value for maintaining the maximum gear ratio γmax in consideration of the above control variation, and belt slippage does not occur. Further, since the primary pressure Pin can be lowered, the fuel consumption improvement effect can also be obtained.

Whereas, when the actual gear ratio γ does not reach the maximum gear ratio γmax, a position of the primary movable sheave 42b is unknown because the rotation sensor detection value does not reflect the actual rotation speed. Therefore, if the primary thrust Win (primary pressure Pin) is lowered from the set value for maintaining the maximum gear ratio γmax in order to realize the maximum gear ratio γmax, the primary movable sheave 42b may move in a direction of loosening the transmission belt 48 to cause occurrence of belt slippage. Therefore, in order to realize the maximum gear ratio γmax, control is performed not to cause belt slippage by setting the thrust (the target primary thrust force Win* and the target secondary thrust Wout*) for maintaining the maximum gear ratio γmax while inhibiting slippage of the transmission belt 48, and adding the above control variation to the target secondary thrust Wout* (secondary command pressure Pouttgt) while performing control toward the maximum gear ratio γmax.

Here, in the low vehicle speed region, in order to maintain the maximum gear ratio γmax, the target secondary thrust Wout* is larger than the target primary thrust Win*, that is, the target secondary pressure Pout* is larger than the target primary pressure Pin*. At this time, if the target secondary pressure Pout* is requested beyond the limit of the oil pump discharge capacity, the actual target secondary thrust Wout* is not to be achieved as the target secondary pressure Pout* since the oil pump discharge capacity is insufficient. Therefore, upshift occurs from the maximum gear ratio γmax, a reaction force from the stopper ring 42d of the primary pulley 42 is not to be received, the belt torque capacity is insufficient, and belt slippage occurs.

Figure 5:
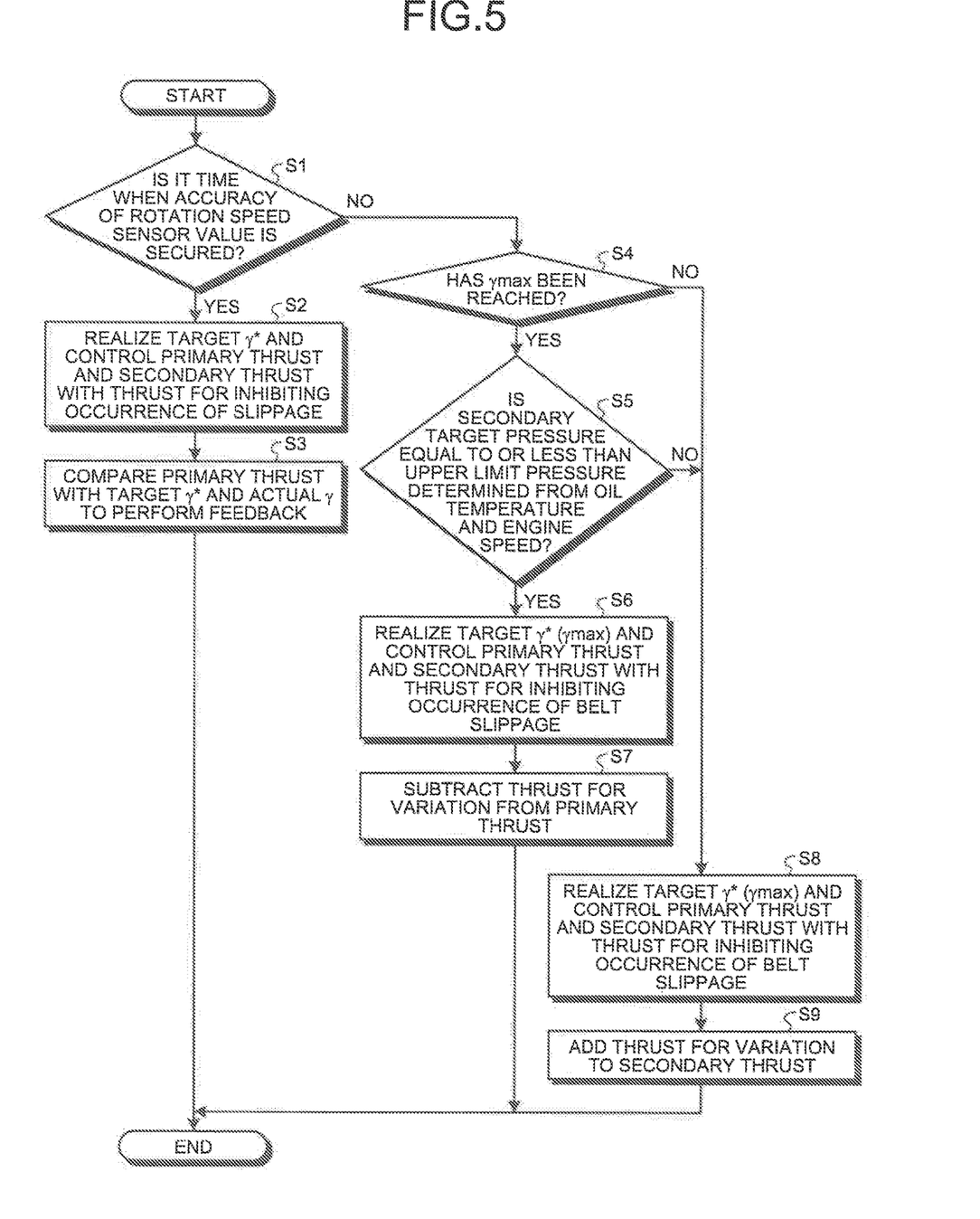
FIG. 5 is a flowchart illustrating an example of control performed by the electronic control unit.

FIG. 5 is a flowchart illustrating an example of control performed by the electronic control unit 50. Note that this control is repeatedly performed with an extremely short cycle time of, for example, several milliseconds to several tens of milliseconds. Moreover, the flowchart of FIG. 5 is executed on the premise that the vehicle is in decelerating traveling where the control is performed toward, for example, the maximum gear ratio γmax.

First, the electronic control unit 50 determines whether it is time when the accuracy of the rotation speed sensor value is secured (step S1). Specifically, by the rotation sensor value accuracy determination unit 124, the electronic control unit 50 determines whether detected values of the input-shaft rotation speed $N_{IN}$ and the output-shaft rotation speed $N_{OUT}$ respectively detected by the input-shaft rotation speed sensor 56 and the output-shaft rotation speed sensor 58 reflect the actual rotation speed, that is, whether the accuracy of the rotation speed sensor value can be secured. At this time, the rotation sensor value accuracy determination unit 124 determines whether the accuracy of the rotation speed sensor value can be secured on the basis of whether the detected values of the input-shaft rotation speed $N_{IN}$ and the output-shaft rotation speed $N_{OUT}$ are equal to or higher than the predetermined extremely low rotation speed N'.

When it is determined in step S1 that it is time when the accuracy of the rotation speed sensor value is secured (Yes in step S1), the electronic control unit 50 realizes the target gear ratio γ*, and controls the primary thrust Win and the secondary thrust Wout with a thrust for inhibiting occurrence of belt slippage (step S2). Specifically, by the continuously variable transmission control unit 122, the electronic control unit 50 outputs the primary command pressure Pintgt and the secondary command pressure Pouttgt to the hydraulic control circuit 100 as the hydraulic control command signal $S_{CVT}$, and controls the primary thrust Win (primary pressure Pin) and the secondary thrust Wout (secondary pressure Pout) so as to obtain the thrust (the target primary thrust Win* and, the target secondary thrust Wout*) for achieving the target, gear ratio γ* of the continuously variable transmission 18 while inhibiting occurrence of belt slippage of the continuously variable transmission 18. At this time, in consideration of variations in hydraulic control related to shifting of the continuously variable transmission 18, a set value of the target secondary thrust Wout* (target secondary pressure Pout*) is corrected on the basis of the secondary pressure sensor value SPout, for example, such that the secondary pressure sensor value SPout becomes the target secondary pressure Pout*. Next, the electronic control unit 50 compares the primary thrust Win with the target gear ratio γ* to perform feedback (step S3). Specifically, the electronic control unit 50 corrects the set value of the target primary thrust Win* (target primary pressure Pin*) by feedback control based on the deviation Δγ between the actual gear ratio γ and the target gear ratio γ* such that the actual gear ratio γ coincides with the target gear ratio γ*.

Whereas, when it is determined in step S1 that it is not time when the accuracy of the rotation speed sensor value is secured (No in step S1), the electronic control unit 50 determines whether the maximum gear ratio γmax has been reached (step S4). Specifically, by the maximum gear ratio reaching determination unit 126, the electronic control unit 50 determines whether the maximum gear ratio γmax has been reached on the basis of the determination as to whether the actual gear ratio γ has already become the maximum gear ratio γmax.

Figure 6:
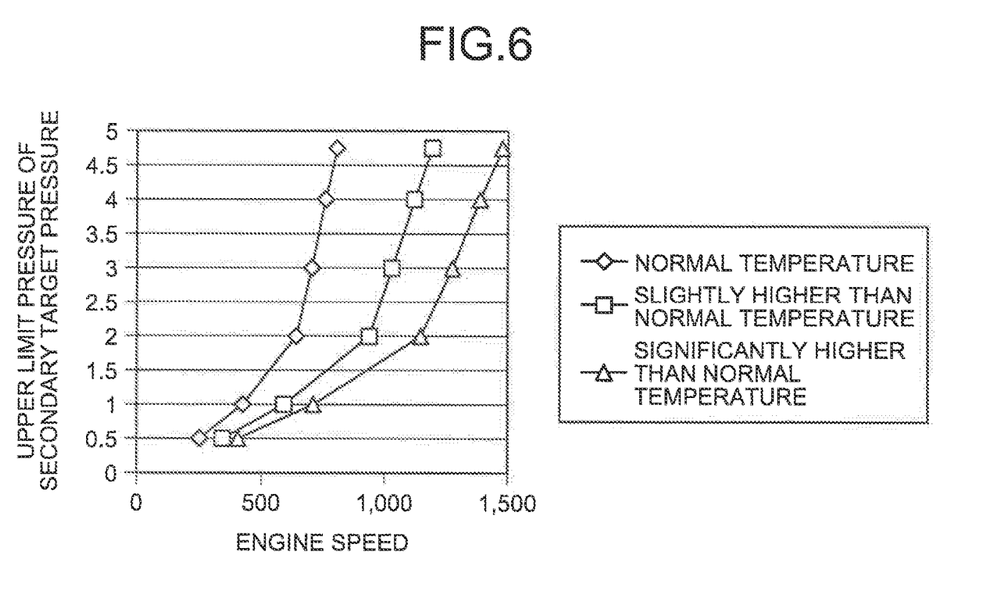
FIG. 6 is a graph illustrating a relationship between an engine speed and an upper limit pressure of a secondary target pressure according to an oil temperature.

When it is determined in step S4 that the maximum gear ratio γmax has been reached (Yes in step S4), the electronic control unit 50 determines, as maximum gear ratio temporary determination, whether the secondary target pressure (target secondary pressure Pout*) is equal to or less than an upper limit pressure determined from the oil temperature $TH_{OIL}$ and the engine speed (engine rotation speed $N_E$) (step S5). At this time, for example, as in the graph illustrated in FIG. 6, a relationship between the engine speed (engine rotation speed $N_E$) and the upper limit pressure of the secondary target pressure (target secondary pressure Pout*) is set in advance for three levels of the oil temperature $TH_{OIL}$, which are: normal temperature; slightly higher than normal temperature; and significantly higher than normal temperature. Note that the upper limit pressure of the secondary target pressure is determined by the pump discharge capacity, and the pump discharge capacity is determined by the oil temperature $TH_{OIL}$ and the engine speed (engine rotation speed $N_E$).

Figure 7:
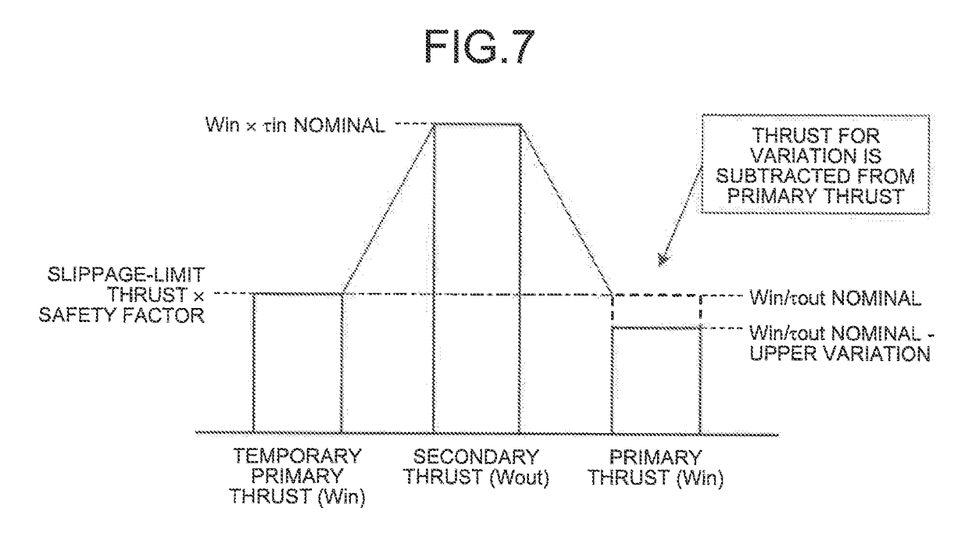
FIG. 7 is an explanatory view of a primary thrust and a secondary thrust at a maximum gear ratio determination time.

When it is determined in step S3 that the secondary target pressure is equal to or less than the upper limit pressure determined from the oil temperature $TH_{OIL}$ and the engine speed (Yes in step S5), the electronic control unit 50 realizes the target gear ratio γ* (maximum gear ratio γmax) as a maximum gear ratio determination time, and controls the primary thrust Win and the secondary thrust Wout with a thrust for inhibiting occurrence of belt slippage (step 6). Specifically, by the continuously variable transmission control unit 122, the electronic control unit 50 controls the primary thrust Win (primary pressure Pin) and the secondary thrust Wout (secondary pressure Pout) so as to achieve the thrust (the target primary thrust force Win* and the target secondary thrust Wout*) for maintaining the maximum gear ratio γmax while inhibiting slippage of the transmission belt 48. At this time, a set value of the target secondary thrust Wout* (target secondary pressure Pout*) is corrected on the basis of the secondary pressure sensor value SPout, for example, such that the secondary pressure sensor value SPout becomes the target secondary pressure Pout*. Next, the electronic control unit 50 subtracts the thrust for a variation from the primary thrust Win (step S7). Specifically, as illustrated in FIG. 7, in order to reliably maintain the maximum gear ratio γmax while inhibiting slippage of the transmission belt 48, the electronic control unit 50 subtracts the upper variation out of the control variation that varies vertically with respect to the thrust for maintaining the maximum gear ratio γmax, and sets the primary thrust Win (the target primary thrust Win*, a target primary command pressure intgt).

Whereas, when it is determined in step S5 that the secondary target pressure is not equal to or less than the upper limit pressure determined from the oil temperature $TH_{OIL}$ and the engine speed. (No in step S5), the electronic control unit 50 cancels the maximum gear ratio temporary determination, realizes the target gear ratio γ* (maximum gear ratio γmax) as a maximum gear ratio non-determination time, and controls the primary thrust Win and the secondary thrust Wout with a thrust for inhibiting occurrence of belt slippage (step S8). Further, similarly, when it is determined in step S4 that the maximum gear ratio γmax has not been reached (No in step S4), the electronic control unit 50 realizes the target gear ratio γ* (maximum gear ratio γmax) as the maximum gear ratio non-determination time, and controls the primary thrust Win and the secondary thrust Wout with a thrust for inhibiting occurrence of belt slippage (step S8).

Figure 8:
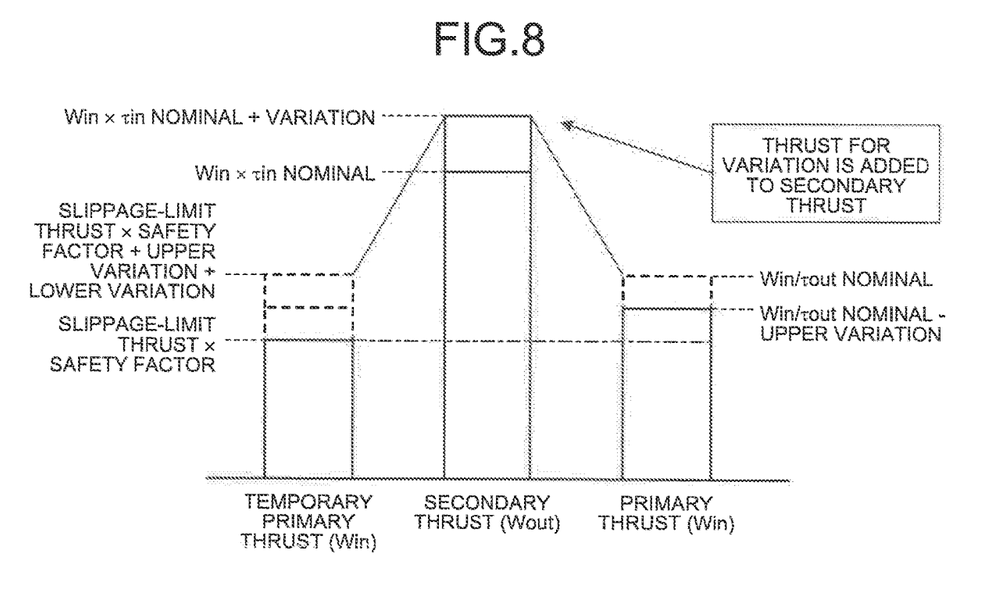
FIG. 8 is a view illustrating a primary thrust and a secondary thrust at a maximum gear ratio non-determination time.

Specifically, in step SB, by the continuously variable transmission control unit 122, the electronic control unit 50 controls the primary thrust Win (primary pressure Pin) and the secondary thrust Wout (secondary pressure Pout) so as to achieve the thrust (the target primary thrust force Win* and the target secondary thrust Wout*) for maintaining the maximum gear ratio γmax while inhibiting slippage of the transmission belt 48. Next, the electronic control unit 50 adds the thrust for a variation to the secondary thrust Wout (step S9). Specifically, as illustrated in FIG. 8, in order to reliably maintain the maximum gear ratio γmax while inhibiting slippage of the transmission belt 48, the electronic control unit 50 sets the secondary thrust Wout (the target secondary thrust Wout*, the secondary command pressure Pouttgt) higher by the control variation with respect to the thrust for maintaining the maximum gear ratio γmax. In addition, a set value of the target secondary thrust Wout* (target secondary pressure Pout*) is further corrected on the basis of the secondary pressure sensor value SPout, for example, such that the secondary pressure sensor value SPout becomes the target secondary pressure Pout*.

In this embodiment, in a case where the target secondary pressure Pout* is smaller than the oil pump discharge capacity when the maximum gear ratio γmax is requested, the electronic control unit 50 sets the target primary pressure Pin* smaller than that in a case where the target secondary pressure Pout* is larger than the oil pump discharge capacity. This suppresses upshift from the maximum gear ratio γmax due to an insufficient oil pump discharge capacity with respect to the target secondary pressure Pout*, and it is possible to maintain the maximum gear ratio γmax while suppressing occurrence of belt slippage.

A control device for a power transmission mechanism according to the present disclosure exhibits effects of suppressing upshift from a maximum gear ratio due to shortage of the oil pump discharge capacity, and being able to maintain the maximum gear ratio while suppressing occurrence of belt slippage.

According to an embodiment, when the maximum gear ratio is reached and the secondary target pressure is equal to or less than an upper limit pressure as the oil pump discharge capacity that is determined based on an oil temperature of the hydraulic oil and an engine speed, a thrust for a variation may be subtracted from the primary thrust.

This can decrease the primary thrust when the maximum gear ratio is maintained, so that the fuel consumption improvement effect can be obtained.

Further, according to an embodiment, when the maximum gear ratio is reached and the secondary target pressure is greater than an upper limit pressure as the oil pump discharge capacity that is determined based an oil temperature of the hydraulic oil and an engine speed, a thrust for a variation may be added to the secondary thrust.

This can allow the maximum gear ratio to be maintained while slippage of a transmission belt is suppressed, by increasing the secondary target thrust by a predetermined value with respect to the thrust for maintaining the maximum gear ratio.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device for a power transmission mechanism, the control device comprising:
    a continuously variable transmission including a primary pulley and a secondary pulley, the primary pulley having a primary fixed sheave, which is fixed to a primary shaft, and a primary movable sheave which rotates integrally with the primary shaft and is relatively movable in an axial direction, the secondary pulley having a secondary fixed sheave, which is fixed to a secondary shaft, and a secondary movable sheave which rotates integrally with the secondary shaft and is relatively movable in an axial direction, and a transmission belt wound around the primary pulley and the secondary pulley;

an oil pump configured to discharge hydraulic oil by being driven by a rotational driving force from an engine; and a hydraulic control device configured to cause the hydraulic fluid discharged from the oil pump to act on the primary movable sheave and the secondary movable sheave, so that the control device is configured to control a primary thrust for moving the primary movable sheave and a secondary thrust for moving the secondary movable sheave, wherein in a case where a secondary target pressure for generating the secondary thrust is smaller than an oil pump discharge capacity when a maximum gear ratio is requested, a primary target pressure for generating the primary thrust is made smaller than that in a case where the secondary target pressure is larger than an oil pump discharge capacity.

2. The control device for a power transmission mechanism according to claim 1, wherein in the continuously variable transmission, the maximum gear ratio is determined by mechanically inhibiting a movement of the primary movable sheave, and the primary thrust is set lower by a predetermined value in a case where an actual gear ratio of the continuously variable transmission has already become the maximum gear ratio, and the secondary target pressure is equal to or less than an upper limit pressure that is determined, as the oil pump discharge capacity, based on an oil temperature of the hydraulic oil and an engine speed.

3. The control device for a power transmission mechanism according to claim 1, wherein the secondary thrust is set higher by a predetermined value in a case where an actual gear ratio of the continuously variable transmission has already become the maximum gear ratio, and the secondary target pressure is larger than an upper limit pressure that is determined, as the oil pump discharge capacity, based on an oil temperature of the hydraulic oil and an engine speed.

* * * * *